United States Patent [19]

Hilal

[11] 4,209,658
[45] Jun. 24, 1980

[54] METHOD AND APPARATUS FOR OPTIMIZING CURRENT LEADS CARRYING VARYING CURRENT

[76] Inventor: Mohamed A. Hilal, 541 ERB 1500 Johnson Dr., Madison, Wis. 53706

[21] Appl. No.: 824,337

[22] Filed: Aug. 15, 1977

[51] Int. Cl.² .................................. H01B 12/00
[52] U.S. Cl. ..................... 174/15 CA; 174/15 BH
[58] Field of Search .......... 174/15 CA, 15 S, 15 BH, 174/15 R, 14 BH, 16 BH, 12 BH

[56] References Cited

U.S. PATENT DOCUMENTS

| | | | |
|---|---|---|---|
| 3,286,014 | 11/1966 | Williams | 174/15 CA |
| 3,371,145 | 2/1968 | Camille, Jr. | 174/15 CA |
| 3,764,726 | 10/1973 | Kohler et al. | 174/15 CA X |
| 3,900,699 | 8/1975 | Penczynkski et al. | 174/15 CA X |
| 3,902,000 | 8/1975 | Forsyth et al. | 174/15 CA X |
| 4,038,492 | 7/1977 | Kullmann | 174/15 CA X |

OTHER PUBLICATIONS

IBM Technical Disclosure, vol. 15, No. 9, Feb. 1973.

*Primary Examiner*—Arthur T. Grimley
*Attorney, Agent, or Firm*—McDougall, Hersh & Scott

[57] ABSTRACT

A method and means for optimizing current leads carrying varying current in super-conducting systems comprising the steps of adjusting the room temperature point of the lead to vary the length of the lead below the room temperature point inversely to the change in the current carried by the lead.

9 Claims, 2 Drawing Figures

METHOD AND APPARATUS FOR OPTIMIZING CURRENT LEADS CARRYING VARYING CURRENT

This invention relates to super-conducting systems and means for optimizing current leads for operation with minimum refrigeration power.

Fusion super-conductive magnets and energy storage super-conductive magnets are examples of large super-conductive systems which are benefited by the practice of this invention. For such magnets, it is preferred to divide them into separate independent systems with separate current leads for safety purposes. The leads are required to conduct current from room temperature to super-conductive systems at cryogenic temperature. For large systems of the type described, the leads are required to carry large currents and, therefore, should be optimized for minimum refrigeration power.

Super-conductive energy storage magnets do not have constant current from time to time, and other super-conductive systems are also faced with variable currents with the result that, other conditions remaining the same, variation in current brings about deviation from the optimum for minimum refrigeration power requirements.

It is an object of this invention to provide a method and means to optimize leads carrying variable current and, therefor, to minimize current lead losses and to provide considerable savings in refrigeration power.

These and other objects and advantages of this invention will hereinafter appear and, for purposes of illustration but not of limitation, embodiments of the invention are shown in the accompanying drawing, in which.

Leads should be optimized for minimum refrigeration power, and, for this purpose require an optimum value of $Il/A$ where $l$ is the length of the lead in the refrigerated state, $I$ the current, and $A$ the cross sectional area of the lead.

For gas cooled leads, the mass flow rate per ampere should be kept constant for optimum operation. In this case, the heat conducted at the room temperature end (Q) is zero, and the temperature anywhere along the lead is lower than room temperature. For values of $Il/A$ higher than optimum, temperatures along the lead are higher than room temperature. On the other hand, for lower values of $Il/A$, Q can become greater than zero at the room temperature end. To operate continuously under optimum conditions requires that the value of $Il/A$ be constant and maintained equal to the optimum value.

In accordance with the practice of this invention, the desired results are achieved by varying the length of the leads subjected to refrigeration inversely in response to variation in current density passing through the leads, where the leads are of constant cross section and the mass flow rate is proportional to the current.

Figure 1:
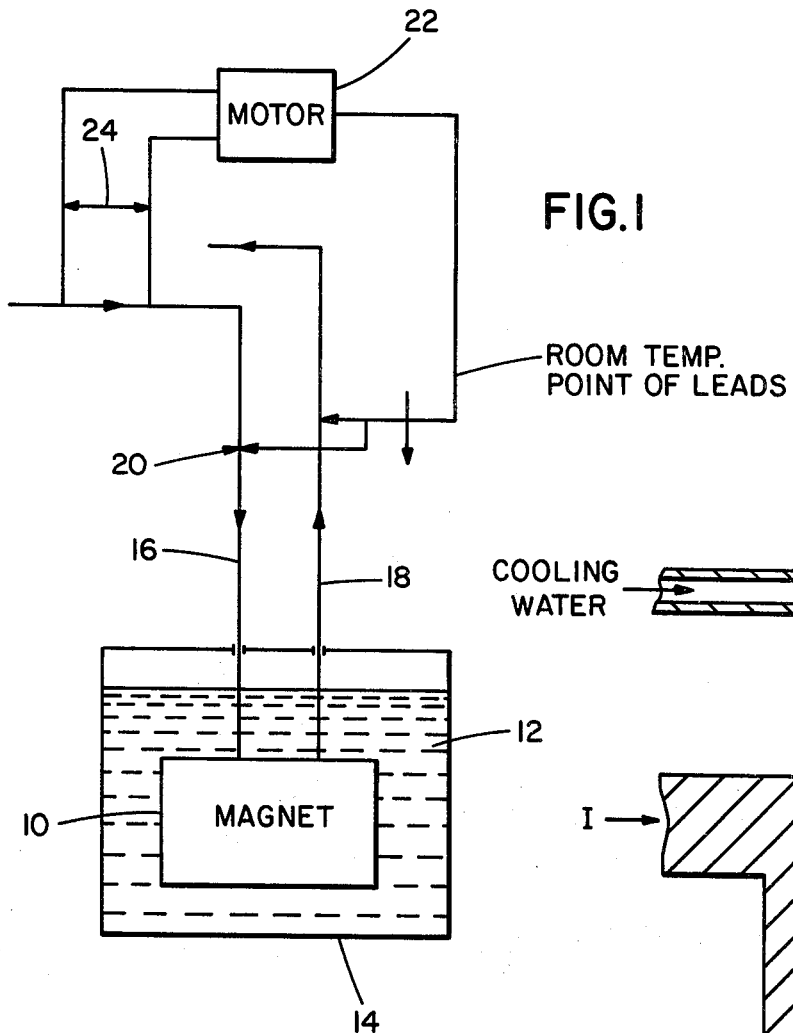
FIG. 1 is a diagramatic view of a system for optimizing current leads.

The basic principle of the invention is illustrated in the diagramatic view of FIG. 1 wherein a magnet 10 is maintained in a supercooled state by immersion in a liquified gas, such as liquid helium 12 in an enclosed container 14, with the magnet connected by an input lead 16 and an output lead 18.

The length of the leads below the room temperature point 20 is adapted to be adjusted by raising or lowering the room temperature point by means of a motor 22 responsive to a control 24 which monitors changes in current passing through the input or output leads 16 and 18.

Thus, in response to an increase in current flow, the motor is energized to lower the room temperature point of the lead thereby correspondingly to reduce the length of the lead maintained far below room temperature; this maintains the optimum value for $Il/A$. Similarly, in response to detection of reduction in the amount of current transmitted through the leads, the motor 22 operates to effect displacement of the room temperature point in a direction to increase the length of lead below room temperature, preferably at cryogenic temperature.

Figure 2:
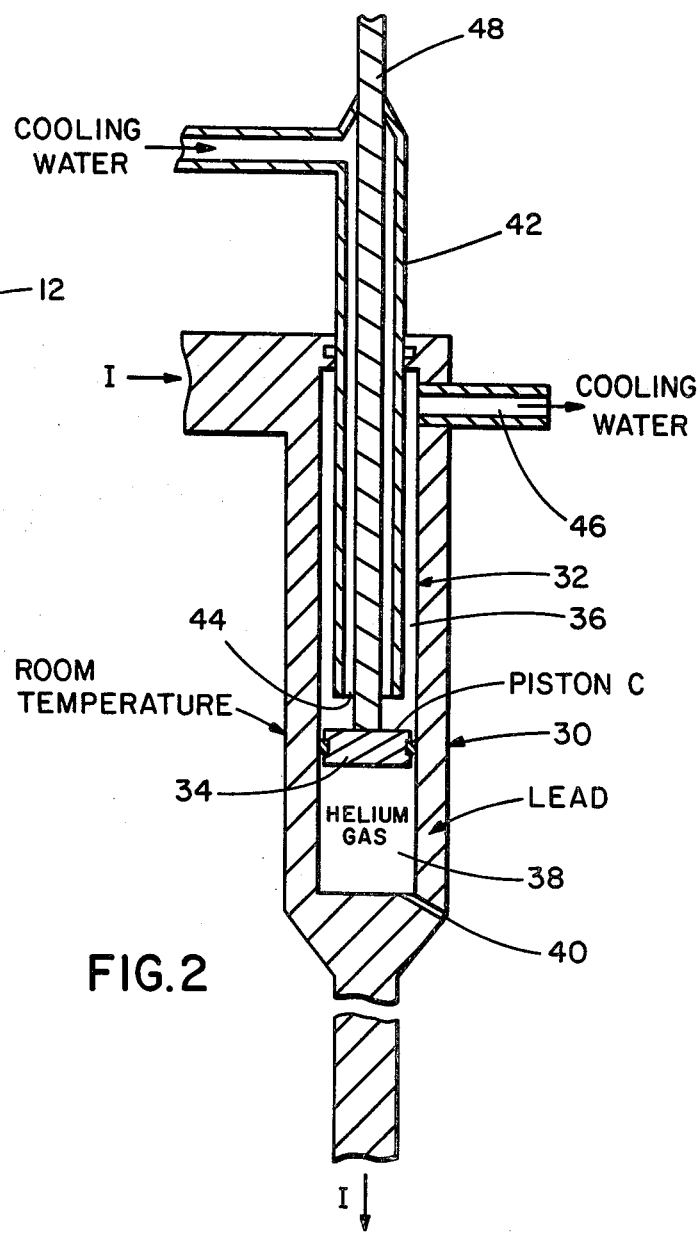
FIG. 2 is a sectional elevational view of a device which may be employed in the practice of this invention.

FIG. 2 illustrates one means by which the room temperature point can be varied responsive to change in the amount of current carried through the lead for optimizing the lead. FIG. 2 shows that portion of the lead 30 which extends through the gas phase above the cryogenic liquid in which the magnet is located. In this instance, the cryogenic liquid is liquified helium, which provides a gas phase of cold helium gas through which the lead extends.

The lead 30, which is of fixed cross sectional area, is formed with an elongate cavity 32 in the form of a cylinder extending lengthwise through the interior thereof and a piston 34 is slideably mounted in sealing relation within the cylinder to subdivide the cavity into an upper chamber 36 and a lower chamber 38. The lower chamber is provided with an opening 40, in the base thereof, to permit flow of helium gas into and out of the chamber 38 in response to movement of the piston 34. Means are provided for the circulation of a fluid, such as water, through the major portion of the upper chamber 36 whereby the separating piston defines the room temperature point. In the illustrated modification, such means comprises a conduit 42 which extends downwardly through the central portion of the cavity and terminates at an outlet 44 adjacent the uppermost point of displacement of the piston and an outlet 46 communicating with the upper end portion of the cavity, so that the fluid will circulate down through the central portion of the cavity and up the outside to the outlet to control the temperature of the adjacent walls of the lead.

A piston rod 48 extends upwardly from the piston through a sealed opening in the lead for endwise displacement of the piston by actuating means, such as by motor 22, in response to current change in the lead. Thus the piston, which defines the room temperature point, can be raised or lowered to the desired position where the $Il/A$ is optimum, thereby automatically to adjust the length of lead to maintain the lead at constant optimum conditions for the utilization of minimum refrigeration power.

By this technique, current lead losses have been markedly reduced and power savings by as much as 50% can be achieved. This is particularly significant in larger super-conducting systems, especially where fusion and energy storage super-conductive magnets are separated into independent systems with separate current leads.

It will be understood that various means other than the motor 22 may be employed for displacement of the room temperature point, such as mechanical jacks, fluid powered means, transmission gears or levers and the like responsive to a power source. The room temperature point need not be at room temperature. The term is intended to define a temperature which is considerably above the cryogenic temperature in which the superconductor or magnet is maintained.

It will be understood that changes may be made in the details of construction, arrangement and operation, without departing from the spirit of the invention, especially as defined in the following claims.

I claim:

1. The method for optimizing the refrigeration power required by current leads carrying varying current in the super-conducting systems comprising the steps of varying the location of the room temperature point of the lead (the point at which the lead temperature is equal to the ambient temperature) to adjust the length of lead extended below the room temperature point inversely so that it is proportional to the change in current carried by the lead.

2. The method as claimed in claim 1, in which the lead is characterized by predetermined cross sectional areas and in which the mass flow rate is adjusted to be proportional to the current.

3. The method as claimed in claim 1, whereby the lead is optimized at constant Il/A in which I is the current, l is the length of the lead below the room temperature point and A is the cross sectional area of the lead.

4. The method as claimed in claim 1 in which the lead is high purity alone or high purity copper characterized by low resistivity and high thermal conductivity below room temperature.

5. A means for adjusting the location of the room temperature point of leads with respect to a superconductive system to optimize the lead carrying varying current in super-conductive systems comprising a lead, means in contact with one portion of the lead for supercooling the contacted portion of the lead, and means in contact with an adjacent portion of the lead for increasing the temperature of the contacted portion of the lead to above supercooled temperature, and means for varying the length of the portion of the lead subject to supercooling responsive to current passing through the lead.

6. A means as claimed in claim 5 which includes a passage within the lead, a piston movable lengthwise through said passage to subdivide the passage into a supercooled chamber and a chamber at a temperature above supercooled temperature, and means for displacement of said piston for varying the length of the chambers responsive to current carried in said lead.

7. A means as claimed in claim 6 which includes means connecting the supercooled chamber with the gas phase of supercooling liquid.

8. A means as claimed in claim 6 which includes means for circulating a head exchange fluid at higher temperature through the other chamber.

9. A means as claimed in claim 8 in which the liquid circulated through the other chamber is water.

* * * * *

UNITED STATES PATENT AND TRADEMARK OFFICE
CERTIFICATE OF CORRECTION

PATENT NO. : 4,209,658
DATED : June 24, 1980
INVENTOR(S) : Mohamed A. Hilal

It is certified that error appears in the above—identified patent and that said Letters Patent is hereby corrected as shown below:

On the title page insert -- (73) Assignee: Wisconsin Alumni Research Foundation, Madison, Wis. --

Signed and Sealed this

Eighth Day of December 1981

[SEAL]

Attest:

GERALD J. MOSSINGHOFF

Attesting Officer

Commissioner of Patents and Trademarks